United States Patent Office 3,720,674
Patented Mar. 13, 1973

3,720,674
4-AMINO-1H-PYRAZOLO[3,4-d]PYRIMIDINE
DERIVATIVES
Hermann Breuer, Burgweinting, and Ernst Schulze and
Uwe D. Treuner, Regensburg, Germany, assignors to
E. R. Squibb & Sons, Inc., New York, N.Y.
No Drawing. Filed Sept. 2, 1970, Ser. No. 69,172
Int. Cl. C07d 51/46
U.S. Cl. 260—256.4 F        3 Claims

ABSTRACT OF THE DISCLOSURE

New pyrozolo[3,4-d]pyrimidine derivatives which have the formula

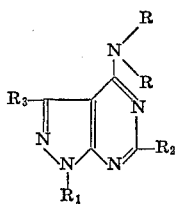

wherein each R is hydrogen, lower alkyl, phenyl, substituted phenyl, hydroxy-lower alkyl or di-lower alkylamino-lower alkylene or together with the nitrogen form a monocyclic nitrogen heterocyclic radical, $R_1$ is lower alkyl, cycloalkyl, phenyl or substituted phenyl, $R_2$ is cycloalkyl, phenyl or substituted phenyl and $R_3$ is hydrogen, lower alkyl, cycloalkyl, phenyl or substituted phenyl, and salts thereof, are useful as hypoglycemic agents and anti-inflammatory agents.

SUMMARY OF THE INVENTION

This invention relates to new 4-amino-1H-pyrazolo-[3,4-d]pyrimidine derivatives which have the formula (I)

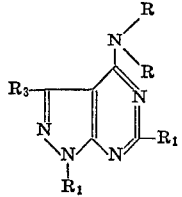

and salts thereof.

The symbols have the following meanings in Formula I and throughout this specification.

Each R is hydrogen, lower alkyl, hydroxy-lower alkyl or di-lower alkylamino-lower alkylene or together with the nitrogen form an unsubstituted or simply substituted monocyclic nitrogen heterocyclic radical totalling 18 atoms (exclusive of hydrogen), $R_1$ is lower alkyl, cycloalkyl, phenyl or substituted phenyl or cycloalkyl and $R_3$ is hydrogen, lower alkyl, cycloalkyl, phenyl or substituted phenyl.

The nitrogen group

represents an acyclic amino group wherein each R is hydrogen, lower alkyl, hydroxy-lower alkyl or di-lower alkylamino-lower alkylene. This basic group may also form a monocyclic nitrogen heterocyclic of 5-, 6- or 7-members (exclusive of hydrogen) in which an additional nitrogen, oxygen or sulfur may be present and which also may bear one or two simple substituents, all totalling up to 18 atoms (exclusive of hydrogen).

Preferred within each of the substituent groups represented by the symbols are the following: each R is lower alkyl, especially methyl or ethyl, or di-lower alkylamino-lower alkylene, especially diethylaminoethyl, or the R's together with the nitrogen to which they are attached form one of the heterocyclics, pyrrolidino, piperidino or piperazino. When one R is di-lower alkylamino-lower alkylene, the other R is preferably hydrogen. $R_1$ is lower alkyl, especially methyl; $R_2$ is phenyl or cyclohexyl; $R_3$ is hydrogen, methyl or ethyl.

DETAILED DESCRIPTION OF THE INVENTION

The lower alkyl groups represented by R, $R_1$ and $R_3$ are straight or branched chain hydrocarbon groups of up to seven carbon atoms, e.g., methyl, ethyl, propyl, butyl, t-butyl and the like, methyl and ethyl being preferred. The cycloalkyl groups are cyclo-lower alkyl groups of three to seven carbon atoms, especially cyclohexyl. The substituted phenyl groups ( i.e., $R_4$-phenyl, are those bearing a halogen, preferably chlorine or bromine, a lower alkyl group of the type referred to previously, preferably methyl or ethyl, carboxy (—COOH) or a lower alkoxy group, e.g., methoxy, ethoxy or the like, in one of the positions on the ring.

In the basic nitrogen containing radical (II)       

in Formula I, each R represents hydrogen, lower alkyl, phenyl, substituted phenyl, hydroxy-lower alkyl or di-lower alkylamino-lower alkylene forming such basic groups as amino, lower alkylamino, e.g., methylamino, ethylamino, isopropylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, and di-lower alkylamino-lower alkyleneamino, e.g., dimethyl-aminomethylamino, diethylaminoethylamino, dimethyl aminoethylamino, phenylamino, carboxyphenylamino and the like.

In addition the R's and the nitrogen may join to form a 5- to 7-membered monocyclic nitrogen heterocyclic containing, if desired, an oxygen, sulfur or an additional nitrogen atom (not more than two hetero atoms altogether) e.g., piperidino, pyrrolidino, morpholino, thiamorpholino, piperazino, hexamethyleneimino and homo-piperazino radicals. These heterocyclic groups may also be substituted by one or two of the groups lower alkyl, lower alkoxy, hydroxy-lower alkyl or alkanoyloxy-lower alkyl. The lower alkyl, lower alkoxy and hydroxy-lower alkyl groups are the same as those already described; the alkanoyl moieties are the acyl radicals of lower fatty acids, including for example, acetyl, propionyl, butyryl and the like, as well as acyl radicals of higher fatty acids of up to 12 carbons.

Heterocyclic groups represented by the radical II include for example, piperidino, di(lower alkyl)piperidino, e.g., 2,3-dimethylpiperidino, 2-, 3- or 4-(lower alkoxy) piperidino, e.g., 2-methoxypiperidino, 2-, 3- or 4-(lower alkyl)piperidino, e.g., 2-, 3- or 4-methylpiperidino, N-methylpiperidino, pyrrolidino, (lower alkyl)pyrrolidino, e.g., 2-methylpyrrolidino, di(lower alkyl)pyrrolidino, e.g., 2,3-dimethylpyrrolidino, (lower alkoxy)pyrrolidino, e.g., 2-ethoxypyrrolidino, N-lower alkyl pyrrolidino, e.g., N-methylpyrrolidino, morpholino (lower alkyl)morpholino, e.g., N-methylmorpholino or 2-methylmorpholino, di (lower alkyl)morpholino, e.g., 2,3-dimethylmorpholino, (lower alkoxyl)morpholino, e.g., 2-ethoxymorpholino, thiamorpholino, (lower alkyl)thiamorpholino, e.g., N-methylthiamorpholino or 2-methylthiamorpholino, di (lower alkyl)thiamorpholino, e.g., 2,3-diethylthiamorpholino, 2,3 - dimethylthiamorpholino, (lower alkoxy) thiamorpholino, e.g., 2-methoxythiamorpholino, piperazino, (lower alkyl)piperazino, e.g., 4-methylpiperazino, 2-methylpiperazino, (hydroxy-lower alkyl)piperazino, e.g., 4-(2-hydroxyethyl)piperizino), di(lower alkyl)piperazino, e.g., 2,3-dimethylpiperazino, alkanoyloxy(lower alkyl)piperazino, e.g., $N^4$-(2-dodecanoyloxyethyl)piperazino, hexamethyleneimino and homopiperazino.

The new compounds of Formula I are produced from intermediates of the formula (II)

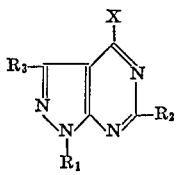

wherein X is halogen, preferably chlorine, by treating such an intermediate with an amine

in toluene or the like.

The intermediate of Formula III may be derived by several synthetic routes. The following reaction sequence is illustrative of one method of synthesis. It will be appreciated that the particular reactant, reagent or medium indicated is illustrative and is not the only one which may be used, but common variants may also be used. The symbols have the meaning already defined.

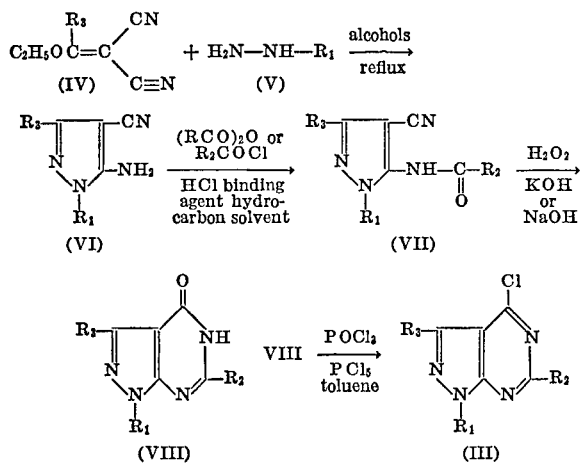

An alternate synthesis includes the following reaction sequence:

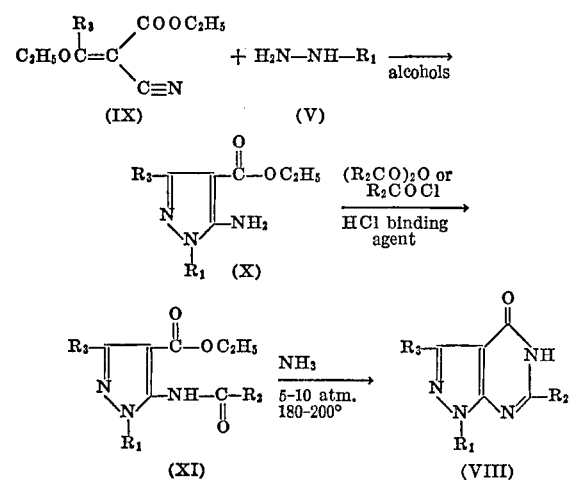

The compound of Formula VIII is then treated with $POCl_3$ and $PCl_5$ as in the previous method.

The compounds of Formula I form acid addition salts by reaction with a variety of strong inorganic and organic acids providing acid addition salts including, for example, hydrohalides (especially hydrochloride and hydrobromide), sulfate, nitrate, borate, phosphate, methanesulfonate, cyclohexanesulfamate, toluenesulfonate and the like. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan, edema assay in rats. The active substance may be utilized in compositions such as tablets, capsules, solutions or suspensions containing up to about 300 mg. per unit of dosage of a compound or mixture of compounds of Formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The compounds of this invention also are hypoglycemic agents which are effective in lowering blood sugar content in mammalian species such as mice, rats, rabbits, dogs or the like in a manner analogous to tolbutamide. Some are particularly noteworthy in their long duration of action. For this purpose a compound or mixture of compounds of Formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The following examples are illustrative of the invention. Additional members are produced in the same manner by appropriate variations of the groups R, $R_1$, $R_2$ and $R_3$ in the reactants used. All temperatures are on the centigrade scale.

Example 1

1 - methyl - 4 - cyano - 5 - aminopyrazole.—To a solution of 70 grams of 98% methyl hydrazine and 700 ml. of ethanol are added altogether 127 gms. of ethoxy methylene malononitrile in such a manner that the solution remains at the boiling point. After completion of the addition the reaction mixture is heated to reflux for 30 minutes. The product is permitted to crystallize overnight in the refrigerator. After filtering under suction and washing with a small amount of cold ethanol 103 gms. of crude 5-amino-4-cyano-1-methylpyrazole remains as yellow crystals, M.P. 216–218°. This product is then used without recrystallizing.

Example 2

1 - methyl - 4 - cyano - 5 - benzoylaminopyrazole.—To a suspension of 6.1 gms. of 1-methyl-4-cyano-5-aminopyrazole in 250 ml. of dioxane are added dropwise 25 ml. of pyridine and 7.3 gms. of benzoyl chloride with vigorous stirring. When all of the benzoyl chloride has been added the reaction mixture is heated at reflux for 1 hour, whereupon a clear solution results. After the completion of the reaction, the dioxane is distilled off on a rotating steam bath. A yellow viscous residue remains which slowly crystallizes on a clay plate. Recrystallization from methanol yields 7 gms. of 1-methyl-4-cyano-5-benzoylaminopyrazole, M.P. 173–175°.

Example 3

1 - methyl - 6 - phenylpyrazolo[3,4 - d]pyrimidin - 4-one.—29 grams of 1 - methyl-4-cyano-5-benzoylaminopyrazole, 450 ml. of 3% hydrogen peroxide and 13 gms. of potassium hydroxide are heated for 5 hours at 70 to 75°. After cooling, the mixture is acidified with glacial acetic acid. A thick white precipitate forms which is washed with ice-water and then recrystallized from ethanol. The 1-methyl-6-phenylpyrazolo[3,4-d]pyrimidin-4-one melts at 250–252°.

Example 4

1 - methyl - 4 - chloro - 6 - phenylpyrazolo[3,4-d]pyrimidine.—2 grams of 1-methyl-6-phenylpyrazolo[3,4-d]pyrimidin-4-one are heated at reflux for 3 hours in 20 ml. of phosphorous oxychloride. The excess phosphorous oxychloride is distilled off and there remains an oil which slowly crystallizes. The crystals are washed with ice-water, dried and recrystallized from cyclohexane. The pure compound melts at 110–111°.

Example 5

1 - methyl - 4 - cyano - 5 - (p-chlorobenzoyl)amino pyrazole.— By substituting p-chlorobenzoyl chloride for the benzoyl chloride in the procedure of Example 2, there is obtained 1-methyl-4-cyano-5-(p-chlorobenzoyl) amino pyrazole in the form of white crystals, M.P. 182°.

Example 6

1 - methyl - 6 - p-chlorophenylpyrazolo[3,4-d]pyrimidin-4-one.—By utilizing the product of Example 5 in the procedure of Example 3, there are obtained white crystals of 1 - methyl - 6-p-chlorophenylpyrazolo[3,4-d]pyrimidin-4-one, which are recrystallized from ethylene glycol, M.P. 290°.

Example 7

1 - methyl - 4 - chloro - 6 - p - chlorophenylpyrazolo[3,4-d]pyrimidine.—By treating the product of Example 6 according to the procedure of Example 4, there is obtained 1 - methyl - 4 - chloro - 6 - p - chlorophenylpyrazolo[3,4-d]pyrimidine in the form of white crystals which is recrystallized from cyclohexane, M.P. 162–164°.

Example 8

1 - methyl - 4 - cyano - 5 - (cyclohexylcarbonylamino) pyrazole.—By utilizing 1-methyl-4-cyano-5-aminopyrazole and cyclohexane carbonyl chloride in the procedure of Example 2, 1 - methyl - 4 - cyano-5-(cyclohexylcarbonylamino)pyrazole is obtained as white crystals, which are recrystallized from methanol, M.P. 163–165°.

Example 9

1 - methyl - 6 - cyclohexylpyrazolo[3,4-d]pyrimidin-4-one.—By treating the product of Example 8 according to the procedure of Example 3, the above product is obtained in the form of white crystals, M.P. 242–244°.

Example 10

1 - methyl - 4 - chloro - 6 - cyclohexylpyrazolo[3,4-d]pyrimidine.—By treating the product of Example 9 according to the procedure of Example 4, the above product is obtained as white crystals which are recrystallized from n-hexane. M.P. 96–97°.

Example 11

1 - methyl - 4 - dimethylamino - 6 - phenylpyrazolo[3, 4-d]pyrimidine.—2.6 grams of 1 - methyl - 4 - chloro-6-phenylpyrazolo[3,4-d]pyrimidine is dissolved in 30 ml. toluene, 1.5 grams of liquid dimethylamine are added and heated at 80° for 30 minutes. A precipitate of dimethylammonium chloride forms. The mixture is filtered and the solvent is evaporated from the filtrate to leave a solid residue. The product, 1 - methyl - 4 - dimethylamino-6-phenylpyrazolo[3,4-d]pyrimidine, is recrystallized from cyclohexane, M.P. 123–125°.

The hydrochloride salt is produced by dissolving the above product in ether and adding an ethereal solution of hydrochloric acid. The salt precipitates and is separated by filtration.

Example 12

1 - methyl - 4 - pyrrolidine - 6 - phenylpyrazolo[3,4-d] pyrimidine.—By substituting an equivalent amount of pyrrolidine for the dimethylamine in the procedure of Example 11, there is obtained 1-methyl-4-pyrrolidino-6-phenylpyrazolo[3,4-d]pyrimidine, M.P. 154–157°.

Example 13

1 - methyl - 4 - diethylamino - 6 - cyclohexylpyrazolo-[3,4-d]pyrimidine.—By treating 1 - methyl - 4 - chloro-6 - cyclohexylpyrazolo[3,4-d]pyrimidine with diethylamine according to the procedure of Example 11 and using cyclohexane as the solvent for recrystallization of the product, 1-methyl-4-diethylamino-6-cyclohexylpyrazolo[3,4-d]pyrimidine is obtained, M.P. 57–59°.

Example 14

1 - methyl - 4 - (2 - carboxyphenyl)amino - 6 - phenylpyrazolo[3,4-d]pyrimidine.—By fusing 1-methyl-4-chloro - 6 - phenylpyrazolo[3,4-d]pyrimidine and anthranilic acid at 150° (without a solvent) and otherwise following the procedure of Example 11, 1-methyl-4-(2-carboxyphenyl)amino-6-phenylpyrazolo[3,4-d]pyrimidine is obtained, M.P. 340° (with dec.).

The following compounds are prepared by the procedure of Example 11 by substituting the appropriate amine for the dimethylamine.

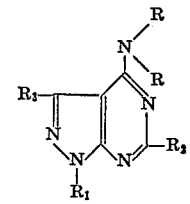

| Example | $R_1$ | $R_2$ | $R_3$ | $-N\begin{smallmatrix}R\\R\end{smallmatrix}$ |
|---|---|---|---|---|
| 15 | $CH_3$ | ⌬ | H | $NH_2$ |
| 16 | $CH_3$ | Same. | H | $-N\diagdown S\diagup$ |
| 17 | $CH_3$ | ....do...... | H | $-N\diagdown S\diagup N-CH_3$ |
| 18 | $CH_3$ | ....do...... | H | $-N\diagdown S\diagup N-CH_2-CH_2OH$ |
| 19 | $CH_3$ | ....do...... | H | $-NH-(CH_2)_2-N(C_2H_5)_2$ |
| 20 | $CH_3$ | ....do...... | H | $\diagdown N\diagup O$ |

The following compounds are prepared by the procedure of Example 11 by substituting the appropriately substituted 4-chloropyrazolo[3,4-d]pyrimidine and the appropriate amine for the starting materials:

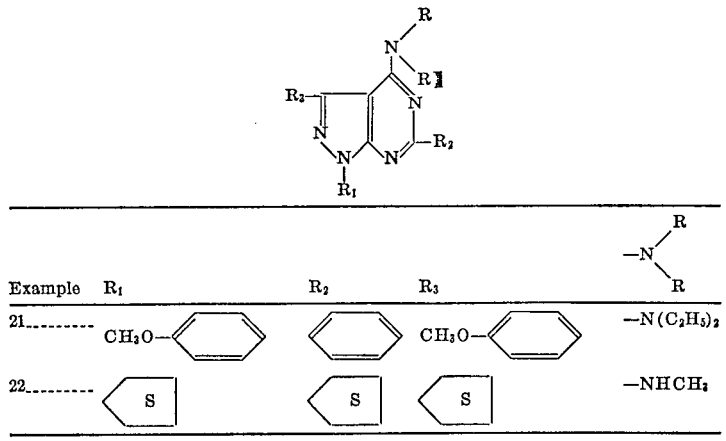

| Example | $R_1$ | $R_2$ | $R_3$ | $-N\begin{smallmatrix}R\\R\end{smallmatrix}$ |
|---|---|---|---|---|
| 21 | $CH_3O-\langle\ \rangle$ | $\langle\ \rangle$ | $CH_3O-\langle\ \rangle$ | $-N(C_2H_5)_2$ |
| 22 | $\langle S\rangle$ | $\langle S\rangle$ | $\langle S\rangle$ | $-NHCH_3$ |

What is claimed is:

1. A compound of the formula

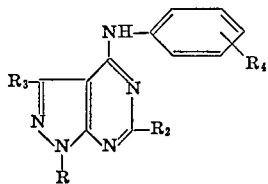

wherein $R_1$ is lower alkyl, 3 to 7 carbon cycloalkyl, phenyl or $R_4$-phenyl, $R_2$ is 3 to 7 carbon cycloalkyl or phenyl, $R_3$ is hydrogen, lower alkyl, 3 to 7 carbon cycloalkyl, phenyl or $R_4$-phenyl and $R_4$ is lower alkyl, halogen, lower alkoxy or carboxy, and physiologically acceptable acid addition salts thereof.

2. A compound as in claim 1 wherein $R_4$ is carboxy.

3. A compound as in claim 1 wherein $R_1$ is methyl, $R_2$ is phenyl, $R_3$ is hydrogen and $R_4$ is o-carboxy.

References Cited

UNITED STATES PATENTS 3,600,389  8/1971  Druey et al. _____ 260—256.4 F
3,211,732  10/1965 Schmidt et al. _____ 260—256.4
3,399,196  8/1968  Druey et al. _____ 260—256.4
2,965,643  12/1960 Druey et al. _____ 260—256.4

OTHER REFERENCES

Taylor et al.: J. Org. Chem. 26, 4967, 4971 (1961).

ALEX MAZEL, Primary Examiner

R. V. RUSH, Assistant Examiner

U.S. Cl. X.R.

260—243 B, 247.2 R, 247.5 B, 310 R, 465.4; 424—251